United States Patent
Lerner (10) Patent No.: US 11,263,901 B1
(45) Date of Patent: Mar. 1, 2022

(54) VEHICLE AS A SENSING PLATFORM FOR TRAFFIC LIGHT PHASE TIMING EFFECTIVENESS

(71) Applicant: FORD GLOBAL TECHNOLOGIES, LLC, Dearborn, MI (US)

(72) Inventor: Jeremy Lerner, Southfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/034,993

(22) Filed: Sep. 28, 2020

(51) Int. Cl.
| | |
|---|---|
| *G08G 1/00* | (2006.01) |
| *G08G 1/082* | (2006.01) |
| *G08G 1/08* | (2006.01) |
| *G06N 20/00* | (2019.01) |
| *G08G 1/01* | (2006.01) |
| *G08G 1/056* | (2006.01) |

(52) U.S. Cl.
CPC ............. *G08G 1/082* (2013.01); *G06N 20/00* (2019.01); *G08G 1/0112* (2013.01); *G08G 1/0145* (2013.01); *G08G 1/056* (2013.01); *G08G 1/08* (2013.01)

(58) Field of Classification Search
CPC .......... G08G 1/082; G08G 1/056; G08G 1/08; G08G 1/0112; G08G 1/1045; G06N 20/00
See application file for complete search history.

(56) References Cited

U.S. PATENT DOCUMENTS

| | | | |
|---|---|---|---|
| 10,127,811 B2 | 11/2018 | Xu et al. | |
| 10,559,201 B1 | 2/2020 | Bauer et al. | |
| 2007/0008173 A1* | 1/2007 | Schwartz ............... | G08G 1/087 340/902 |
| 2010/0305858 A1* | 12/2010 | Richardson ........ | G06K 9/00785 701/301 |
| 2012/0326890 A1* | 12/2012 | Cross ..................... | G08G 1/087 340/906 |
| 2014/0358841 A1* | 12/2014 | Ono ..................... | G08G 1/0129 706/52 |
| 2018/0190111 A1* | 7/2018 | Green ..................... | G08G 1/052 |
| 2018/0286228 A1* | 10/2018 | Xu ........................ | G08G 1/0112 |
| 2019/0019410 A1* | 1/2019 | Sheynman ............ | H04W 48/18 |
| 2019/0206236 A1* | 7/2019 | Tao ....................... | G08G 1/0968 |
| 2019/0347933 A1* | 11/2019 | Zhang ................... | G06N 3/084 |
| 2020/0126408 A1* | 4/2020 | Gigengack ............ | B60W 30/12 |
| 2020/0410855 A1* | 12/2020 | Zalila-Wenkstern ..... | G08G 1/08 |
| 2021/0158062 A1* | 5/2021 | Yu ........................ | G01C 21/30 |

* cited by examiner

*Primary Examiner* — Ojiako K Nwugo
(74) *Attorney, Agent, or Firm* — Michael J. Spenner; Brooks Kushman P.C.

(57) ABSTRACT

Traffic light phase timing effectiveness is determined. Connected vehicle data indicative of traffic conditions for one or more intersections is received. Factors from the connected vehicle data that are indicative of intersection performance are identified. The factors are weighted according to defined weights to determine an intersection score. Based on the score failing to meet one or more criteria, an alert to adjust intersection cycle is provided.

20 Claims, 8 Drawing Sheets

VEHICLE AS A SENSING PLATFORM FOR TRAFFIC LIGHT PHASE TIMING EFFECTIVENESS

TECHNICAL FIELD

Aspects of the present disclosure generally relate to use of vehicles as a sensing platform for traffic light phase timing effectiveness.

BACKGROUND

V2X communication allows vehicles to exchange information with other vehicles, as well as with infrastructure, pedestrians, networks, and other devices. Vehicle-to-infrastructure (V2I) communication enables applications to facilitate and speed up communication or transactions between vehicles and infrastructure.

SUMMARY

In one or more illustrative examples, a system for determining traffic light phase timing effectiveness is provided. The system includes a server in communication with a plurality of vehicles. The server is programmed to receive data from a plurality of vehicles with respect to traffic information for an intersection having a plurality of legs, the intersection being controlled by a traffic control having a cycle for each leg including phases of prohibiting traffic to proceed, allowing traffic to proceed, and warning traffic that the cycle is changing from allowing traffic to proceed to prohibiting traffic to proceed. The traffic information includes a number of vehicles that are travelling upstream of the intersection and are required to stop when the traffic light changes phase, a number of vehicles that travel in a cross-traffic direction to the intersection when a traffic light of the intersection is red in a vehicle travel direction, a number of vehicles that accelerate to traverse through the traffic light before the traffic light changes phase; and a number of vehicles that brake to stop in advance of the intersection. The server generates a score for the intersection according to a weighting of the traffic information, the score indicating a relative level of acceptability of the cycle; and indicates, based on the score, whether the intersection is a candidate for adjustment of the cycle.

In one or more illustrative examples, a method for determining traffic light phase timing effectiveness is provided. Connected vehicle data indicative of traffic conditions for one or more intersections is received. Factors from the connected vehicle data that are indicative of intersection performance are identified. The factors are weighted according to defined weights to determine an intersection score. Based on the score failing to meet one or more criteria, an alert to adjust intersection cycle is provided.

In one or more illustrative examples, a non-transitory computer-readable medium includes instructions for determining traffic light phase timing effectiveness that, when executed by a processor of a cloud server, cause the cloud server to perform operations including to receive connected vehicle data indicative of traffic conditions for one or more intersections; identify factors from the connected vehicle data that are indicative of intersection performance; weight the factors according to weights to determine an intersection score; and based on the score failing to meet one or more criteria, provide an alert to adjust intersection cycle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Often traffic lights change phase when no vehicles are present going in the direction of traffic that is about to become green. This may be a frustration for drivers. One possible cause for such a condition is poor signal phase timing set by the maintainer of the traffic lights. As explained in detail herein, connected vehicles can use vehicle sensors to determine when traffic lights change phase when there is no traffic in the perpendicular direction using vehicle sensors.

Figure 1:
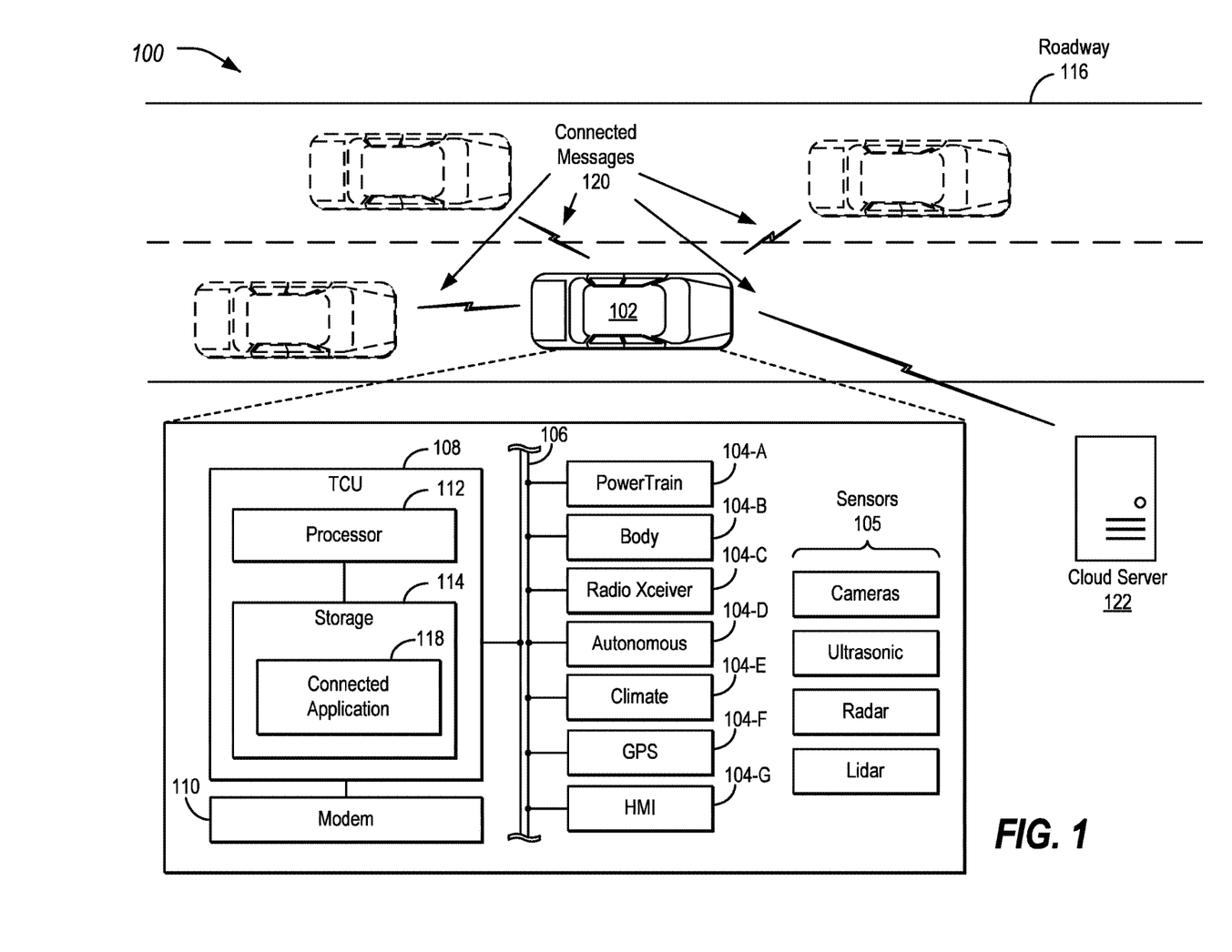
FIG. 1 illustrates an example system for the use of vehicles as a sensing platform for traffic light phase timing effectiveness.

FIG. 1 illustrates an example system 100 for the use of vehicles 102 as a sensing platform for traffic light phase timing effectiveness. The vehicle 102 may include various types of automobile, crossover utility vehicle (CUV), sport utility vehicle (SUV), truck, recreational vehicle (RV), boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). Alternatively, the vehicle 102 may be an Automated Vehicle (AV). The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs. It should be noted that while automotive vehicles 102 are being used as examples of traffic participants, other types of traffic participants may additionally or alternately be used, such as bicycles, scooters, and pedestrians, which may be equipped with V2X technology.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an autonomous controller 104-D may be configured to provide commands to control the powertrain, steering, or other aspects of the vehicle 102; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The controllers 104 of the vehicle 102 may make use of various sensors 105 in order to receive information with respect to the surroundings of the vehicle 102. In an example, these sensors 105 may include one or more of cameras (e.g., advanced driver-assistance system (ADAS) cameras), ultrasonic sensors, radar systems, and/or lidar systems.

The vehicle bus 106 may include various methods of communication available between the vehicle controllers 104, as well as between the telematics control unit (TCU) 108 and the vehicle controllers 104. As some non-limiting examples, the vehicle bus 106 may include one or more of a vehicle controller area network (CAN), an Ethernet network, and a media-oriented system transfer (MOST) network. Further aspects of the layout and number of vehicle buses 106 are discussed in further detail below.

The TCU 108 may include network hardware configured to facilitate communication between the vehicle controllers 104 and with other devices of the system 100. For example, the TCU 108 may include or otherwise access a cellular modem 110 configured to facilitate communication with other vehicles 102 or with infrastructure. The TCU 108 may, accordingly, be configured to communicate over various protocols, such as with a communication network over a network protocol (such as Uu). The TCU 108 may, additionally, be configured to communicate over a broadcast peer-to-peer protocol (such as PC5), to facilitate C-V2X communications with devices such as other vehicles 102. It should be noted that these protocols are merely examples, and different peer-to-peer and/or cellular technologies may be used.

The TCU 108 may include various types of computing apparatus in support of performance of the functions of the TCU 108 described herein. In an example, the TCU 108 may include one or more processors 112 configured to execute computer instructions, and a storage 114 medium on which the computer-executable instructions and/or data may be maintained. A computer-readable storage medium (also referred to as a processor-readable medium or storage 114) includes any non-transitory (e.g., tangible) medium that participates in providing data (e.g., instructions) that may be read by a computer (e.g., by the processor(s)). In general, the processor 112 receives instructions and/or data, e.g., from the storage 114, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

The TCU 108 may be configured to include one or more interfaces from which vehicle information may be sent and received. In an example, the TCU 108 may be configured to facilitate the collection of connected vehicle data and/or other vehicle information from the vehicle controllers 104 connected to the one or more vehicle buses 106. While only a single vehicle bus 106 is illustrated, it should be noted that in many examples, multiple vehicle buses 106 are included, with a subset of the controllers 104 connected to each vehicle bus 106. Accordingly, to access a given controller 104, the TCU 108 may be configured to maintain a mapping of which vehicle buses 106 are connected to which controllers 104, and to access the corresponding vehicle bus 106 for a controller 104 when communication with that particular controller 104 is desired.

The TCU 108 may be further configured to periodically transmit connected messages 120 for reception by other vehicles 102. For instance, the frequency may be on the order of every ten milliseconds. The TCU 108 may be further configured to receive connected messages 120 from other vehicles 102. In an example, the management of sending and receiving of connected vehicle data may be handled by a connected application 118 executed by the TCU 108. The connected messages 120 may include collected information retrieved from the controllers 104 over the vehicle buses 106. In many examples, the collected information data may include information useful for autonomous vehicle operations or driver-assistance vehicle operations. The connected vehicle data information retrieved by the TCU 108 may include, as some non-limiting examples, latitude, longitude, time, heading angle, speed, lateral acceleration, longitudinal acceleration, yaw rate, throttle position, brake status, steering angle, headlight status, wiper status, external temperature, turn signal status, vehicle length, vehicle width, vehicle mass, and bumper height. The connected vehicle data information may also include, weather data (such as ambient temperature, ambient air pressure, etc.), traction control status, wiper status, or other vehicle status information (such as the status of exterior vehicle lights, type of vehicle, ABS system status, etc.). In one example, the connected messages 120 may take the form of BSM messages as described in the SAE J2735.

While not shown, in some examples traffic participants may additionally involve communication via one or more roadside units (RSUs). The RSU may be a device with processing capabilities and networking capabilities, and may be designed to be placed in proximity of the roadway 116 for use in communicating with the vehicles 102. In an example, the RSU may include hardware configured to communicate over the broadcast peer-to-peer protocol (such as PC5), to facilitate C-V2X communications with the vehicles 102. The RSU may, accordingly, be able to communicate with multiple vehicles 102 along a specific roadway 116 or in a specific area. The RSU may also have wired or wireless backhaul capability to allow for communication with other elements of a traffic control system, via e.g., Ethernet, or cellular connection to the cellular network infrastructure, for example over Uu interface.

Figure 2A:
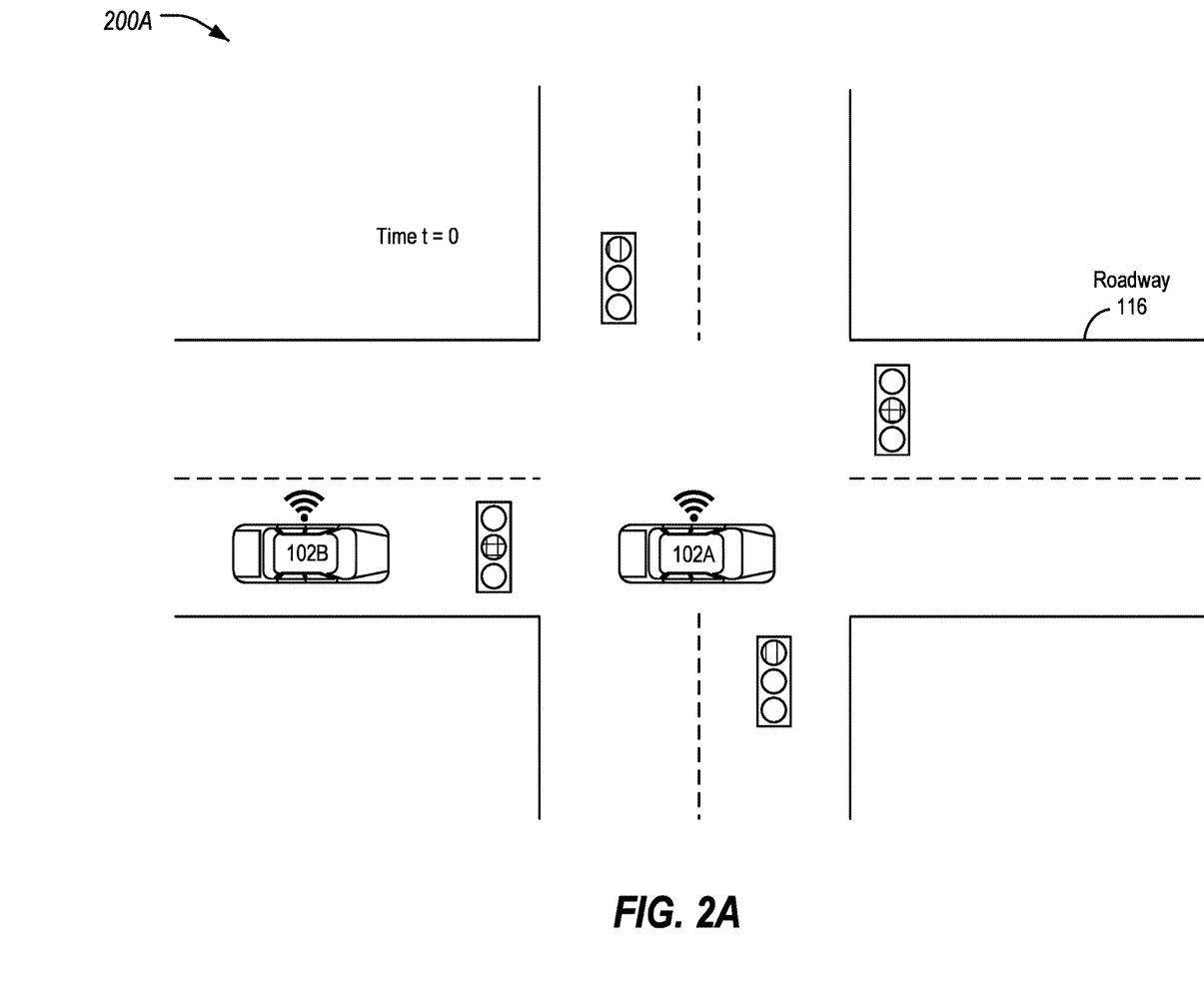
FIGS. 2A and 2B illustrate an example scenario of vehicles traversing a roadway where there is no vehicle traffic detected in a perpendicular direction.
Figure 2B:
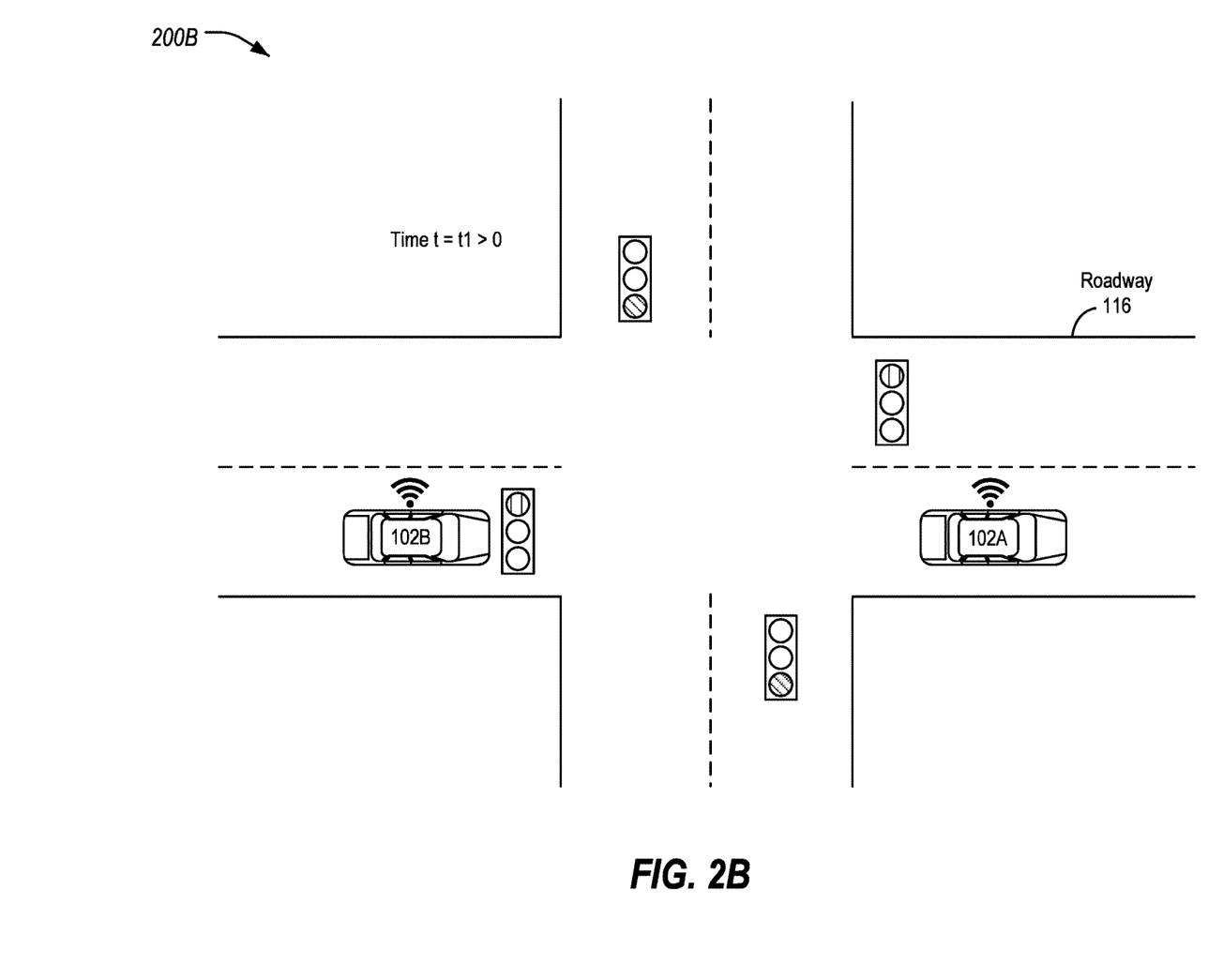

FIGS. 2A and 2B illustrate an example scenario of vehicles 102 traversing a roadway 116 where there is no vehicle traffic detected in a perpendicular direction. As shown in FIG. 2A, at time t=0 a vehicle 102A is passing through an intersection on a yellow light. A vehicle 102B is not yet within the intersection at the yellow light. A two-way cross street of the intersection has red lights and no traffic. As shown in FIG. 2B, at time $t=t_1>0$, the vehicle 102A has completed traversing the intersection, but the vehicle 102B was stopped. The light for the vehicle 102B is now red, and the lights for cross traffic are now green. Significantly, no vehicles 102 are headed along the cross street, but the light changes phase anyway.

The vehicles 102 (e.g., including the vehicles 102A and 102B) may use the vehicle sensors 105 to determine when traffic lights change phase when there is no traffic in the perpendicular direction. For instance, as the vehicle 102B is required to stop at an intersection that has only recently changed to red, vehicle sensors 105 can determine that the light was green and has now become red the traffic in the perpendicular direction. This information can be sensed, recorded, and sent to the cloud server 122.

When the vehicle 102 traverses through an intersection that is just about to turn red (e.g., as determined by a rear facing vehicle sensor 105) or has just turned yellow (e.g., as determined by vehicle sensors 105), the traffic waiting to travel in the perpendicular direction can be estimated. In an example, a number of vehicles 102 waiting can be detected from ADAS cameras using image processing (e.g., a convolutional neural network trained to classify vehicles 102). In another example, ultrasonic and/or radar sensors may determine an estimated count of vehicles 102 or at least the presence of vehicles 102 waiting to travel in the perpendicular direction. Note that vehicles 102 that turn left from the perpendicular road would probably be sufficient reason to say there were vehicles 102 waiting to turn, but in areas where turning right on red is allowed, vehicles 102 turning right from the perpendicular road may be either downweighted or not considered at all.

Note that the current phase of the traffic light is not entirely necessary (though its detection may improve system performance), as when a vehicle 102 stops ahead of an intersection (which can be visually detected or the current GPS coordinates can be compared to the known intersection GPS coordinates), the light has likely turned red. Then, the traffic flowing in the perpendicular can be sensed from the vehicles 102 stopped at the intersection. This component does not require visual or other recognition of the traffic signal phase.

The data from the connected vehicles 102 can be sent to the server 122 for processing, where intersections that often change phases when no vehicles 102 are waiting to traverse in the perpendicular direction can be identified.

Further, the number of vehicles 102 forced to stop for a traffic light that has no traffic waiting to go in the perpendicular direction can be estimated based on the vehicle sensors 105 and number of connected vehicles 102 present at the intersection. That is, a count of the vehicles 102 travelling in the vehicle travel direction can be estimated based on vehicle sensors 105 and the number that stop at a red light (where little to no traffic flows in the perpendicular direction) can be estimated. Further, vehicles 102 that accelerate rapidly and vehicles 102 that brake harshly or suddenly near the intersections when they change phase can be estimated from vehicle sensors 105.

The number of nearby vehicles 102 that accelerate or brake rapidly can be estimated based on optical flow from single or multiple images, object tracking and speed estimation from multiple images, speed estimation based on radar or ultrasonic contacts, or other ADAS sensors 105. Further, connected vehicles 102 themselves can send data about their acceleration and braking at intersections directly from the vehicle 102.

Figure 3A:
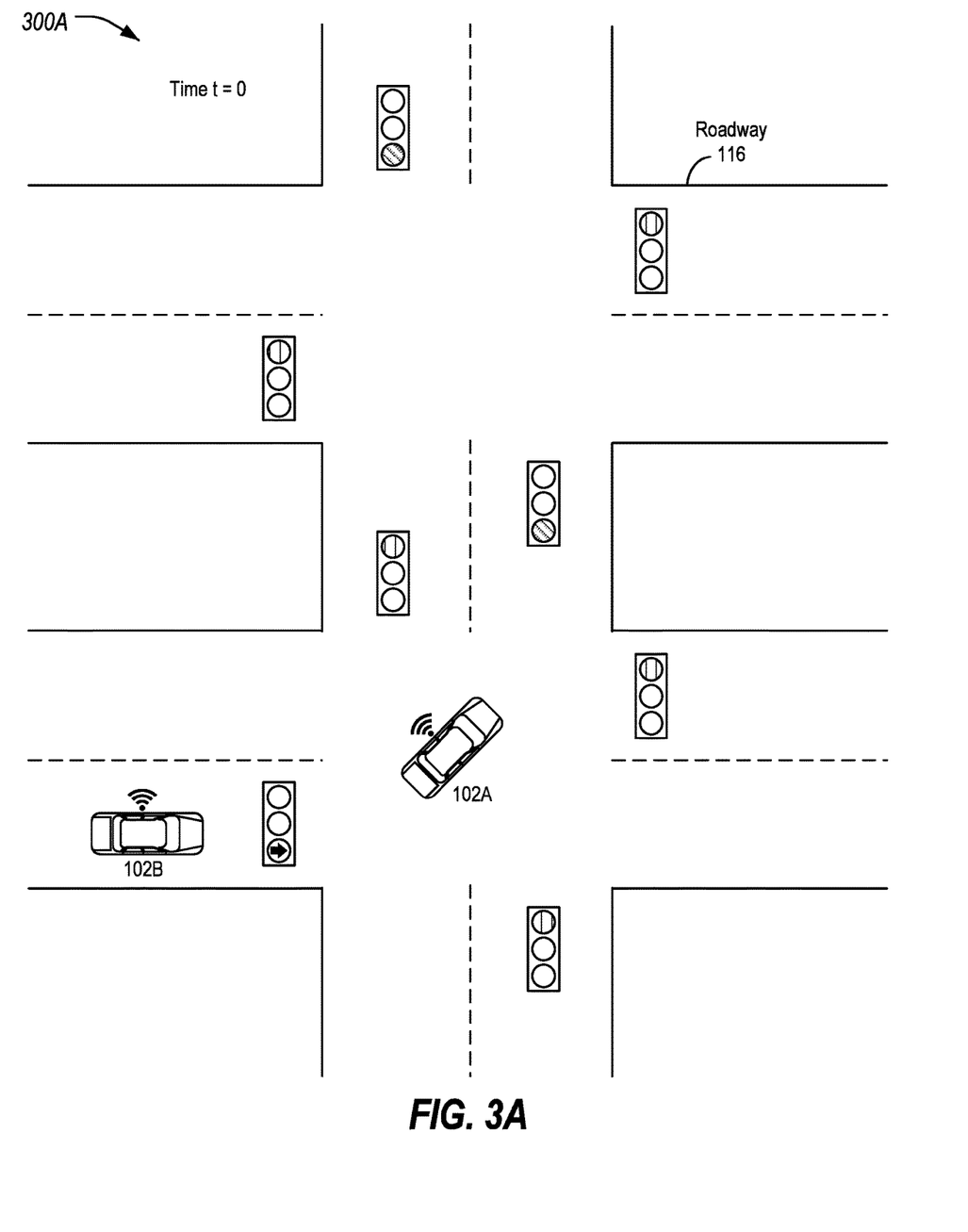
FIGS. 3A-3B illustrate an example of a traffic phase timing that may cause rapid acceleration or breaking events for vehicles.

FIGS. 3A-3B illustrate an example of a traffic phase timing that may cause rapid acceleration or breaking events for vehicles 102. As shown in FIG. 3A, at time t=0, vehicles 102A and 102B are entering a lower intersection on a green arrow, allowing them to turn left. The other legs of the lower intersection have red lights. In an upper intersection, the leg onto which the vehicles 102A and 102B are turning also has a green light. The cross-traffic legs of the upper intersection have red lights. (It should be noted that that the vehicles 102 can use sensors 105 to determine the behavior of other vehicles 102. That is, not all vehicles 102 need to be connected vehicles 102 in these examples.)

Figure 3B:
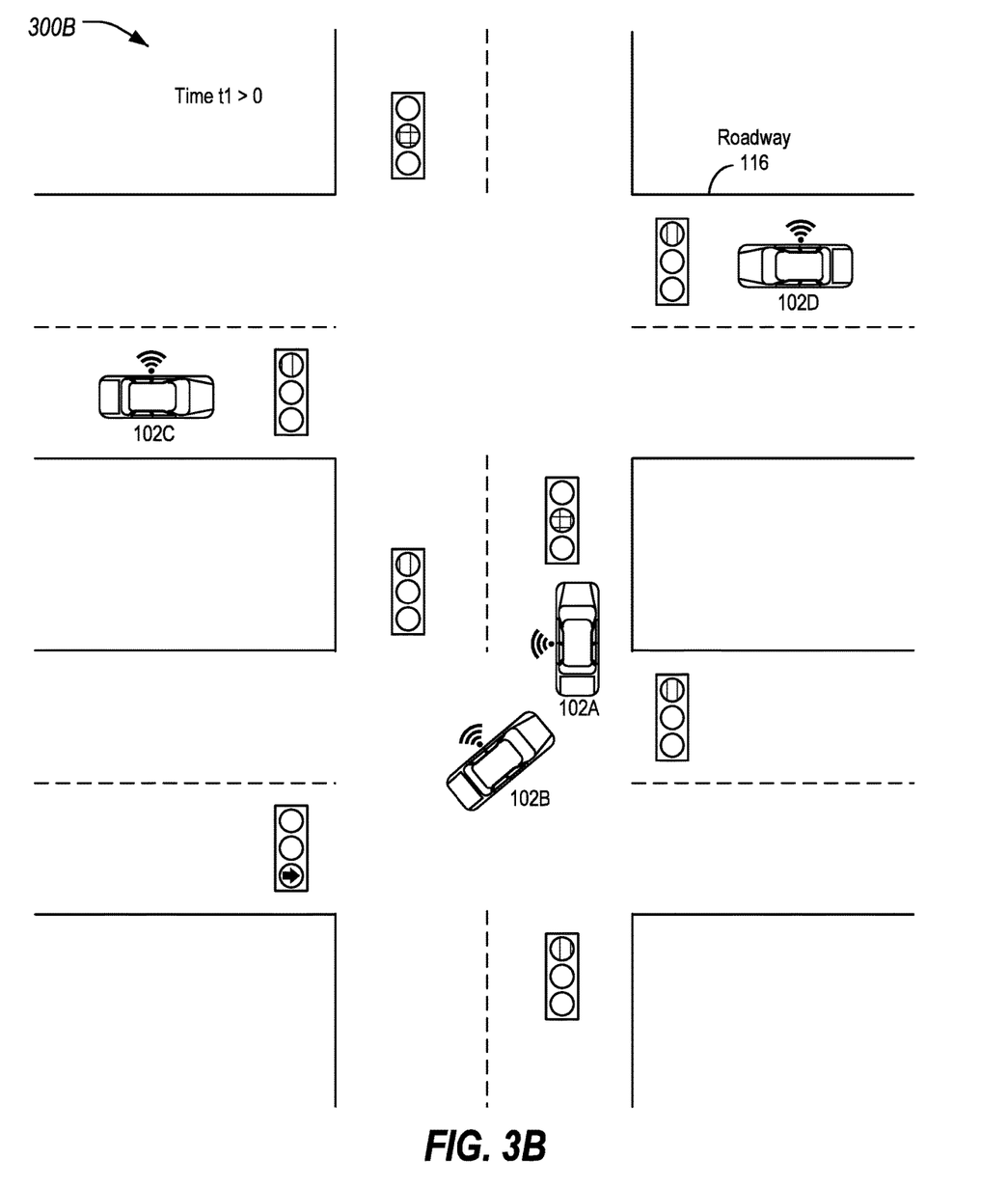

As shown in FIG. 3B, at time $t=t_1>0$, the vehicles 102A and 102B are proceeding through the lower intersection and towards the upper intersection. Vehicles 102C and 102D can be seen as awaiting a green signal on the cross-traffic legs of the upper intersection. However, the light for the upper intersection is turning yellow for the vehicle 102A and 102B. The vehicle 102A may accelerate rapidly to travel through the yellow light. The vehicle 102B may accelerate rapidly and then brake harshly to stop before the light turns red. This combination of signal timing may be identified as causing the poor signal coordination based on connected vehicle 102 data, as vehicles 102 that just turned may likely experience such issues at the upper intersection.

The traffic information elements discussed above with respect to FIGS. 2 and 3 can be synthesized to create a score for intersections where intersections that cause the most vehicles 102 to wait for few to no vehicles 102 moving in the perpendicular direction are identified. Such a score can be based on a formula such as:

$$S=x*p+y*d+z*a+w*b$$

where:

x, y, z, and w are weights;

p is the number of vehicles 102 that are travelling upstream of the intersection and are required to stop when it changes phase;

d is the number of vehicles 102 that are cross traffic (e.g., traveling in an opposing intersection leg, such as along a perpendicular side street) when the traffic light is red in the vehicle travel direction (or a binary variable that is zero when there is cross traffic and nonzero when there is no cross traffic, depending on whether high or low scores are desired to be representative of intersections requiring mitigation);

a is the number of vehicles 102 that accelerate rapidly to travel through the light before it changes; and b is the number of vehicles 102 that brake harshly or suddenly (as compared to a predefined deceleration or brake pressure) to stop in advance of the intersection.

It should be noted that the weights x, y, z, and w may additionally or alternately be set to normalize the values p, d, a, and b to aid in comparing intersections with vastly different traffic flow. It should additionally be noted that the weights x, y, z, and w could be positive or negative. For instance, in one example the weights may be set to prefer p to be low, but for d to be high for an acceptable signal phase timing. It should also be noted that the values p, d, a, and b are examples, and more, fewer, or different values may be considered in.

Figure 4:
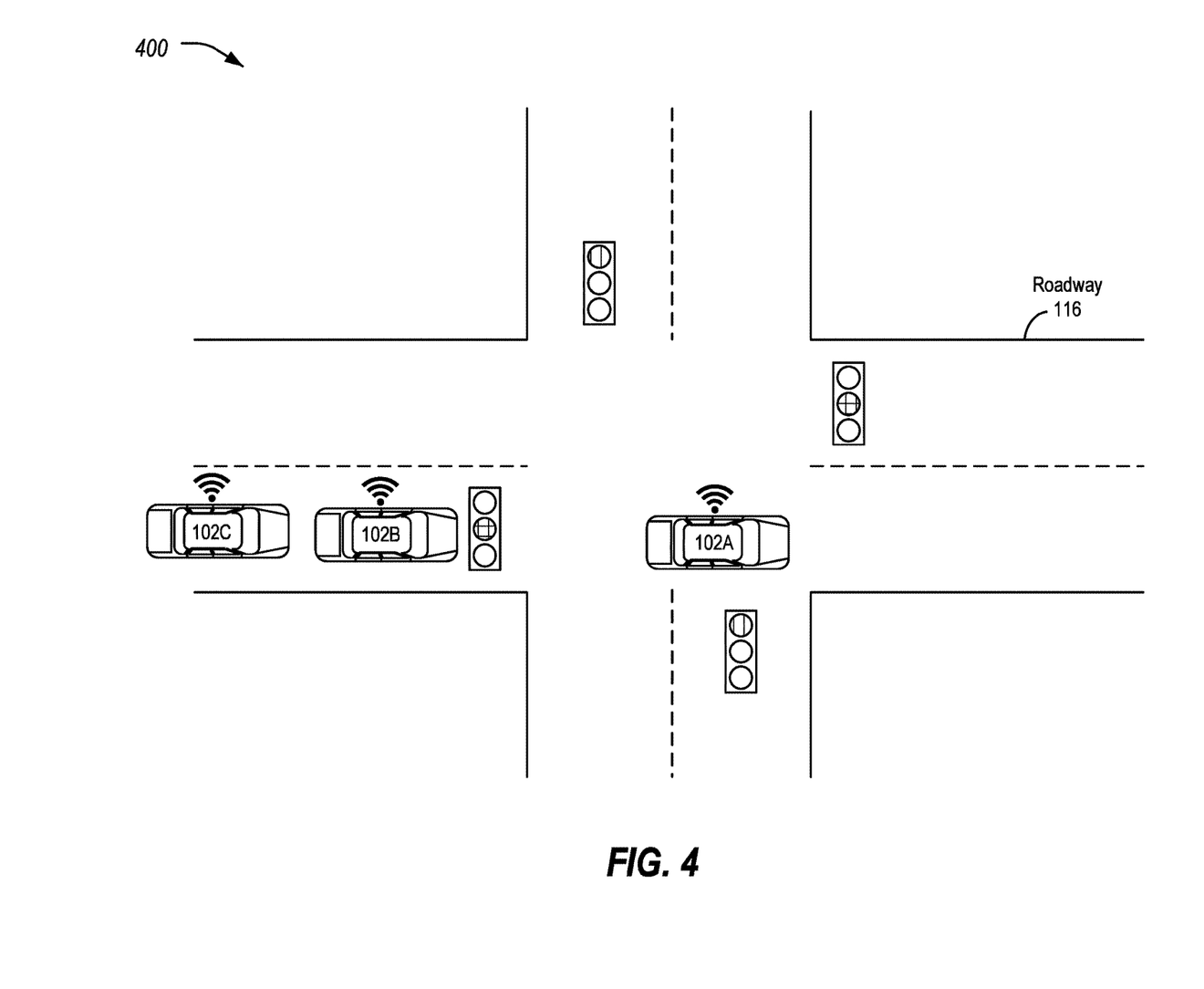
FIG. 4 illustrates an example scenario for determination of a score for an intersection.

FIG. 4 illustrates an example scenario for determination of a score for an intersection. As shown, a vehicle 102A is accelerating quickly through the intersection on yellow. This may be included in the a and the p of the equation. Also shown, vehicles 102B and 102C are performing harsh braking to avoid entering the intersection before the light turns red. These may be included in the b of the equation. No traffic is waiting to travel on the other intersection legs. This may be included in the d of the equation.

The score can be calculated every time a vehicle detects one of the two states mentioned above (the light is about to change or just changed) or over many vehicle 102 interactions with the intersections and aggregated as a set of scores.

Intersections with outlier scores can be identified as requiring mitigation, which may, as one example, include installation of a sensor 105 (e.g., a road side unit based sensor, as discussed above) to detect the presence of vehicles 102 travelling in one or both directions or simply different phase timing. Intersections can be split into sub groupings according to time (e.g., if issues exist only during certain timeframes, such as the morning rush hour but not the afternoon), visibility conditions, etc. That is, the data can be binned into bins of time (e.g., one to six hours) to determine if the problems arise only at certain times of day. Further, driver behavior can be binned, shown in FIGS. 3A-3B). That is, vehicles 102 that just turned left and experience problems with the next intersection downstream can identify problems with the combination of lights as the vehicles 102 that experience problems at a downstream signal may all share certain behavior at prior intersections (such as turning left, turning right, quick acceleration, delayed acceleration due to red light running in the perpendicular direction, etc.).

Intersections that have a significant number of vehicles 102 braking harshly or accelerating rapidly (through yellow lights in the target intersection itself or intersections downstream of it) can be targeted for new phase timing relative to the surrounding intersections. For example, perhaps whenever a connected vehicle turns left on a certain road, they and the surrounding vehicles 102 must accelerate rapidly to travel through a light down the road and cannot pass through the light on green unless the vehicle is the first or second car to turn, accelerate rapidly, and maintain a high speed. Such an intersection, as well as the issues it typically causes, can be identified to city planners.

Additionally or alternatively, the number of emergency vehicles 102 attempting to traverse through the intersection and their approximate delay as a result of the intersection's current traffic flow can be tracked from connected vehicles 102. That is, when an emergency vehicle 102 is forced to use its lights and sirens to stop traffic flow in the perpendicular direction to their travel direction, they generally must cautiously approach the intersection. Intersections where emergency vehicles are seen by connected vehicles 102 to use lights and sirens (as determined by vehicle ADAS sensors 105) to cross through the intersection against traffic can be tracked. And, intersections where this situation happens frequently can be targeted for connectivity to adjust phase timing when emergency vehicles are approaching. That is, this methodology can be utilized to determine intersections that would benefit most from connectivity or installed sensors to ensure optimal traffic flow and minimal disruption to emergency service vehicles 102.

Figure 5:
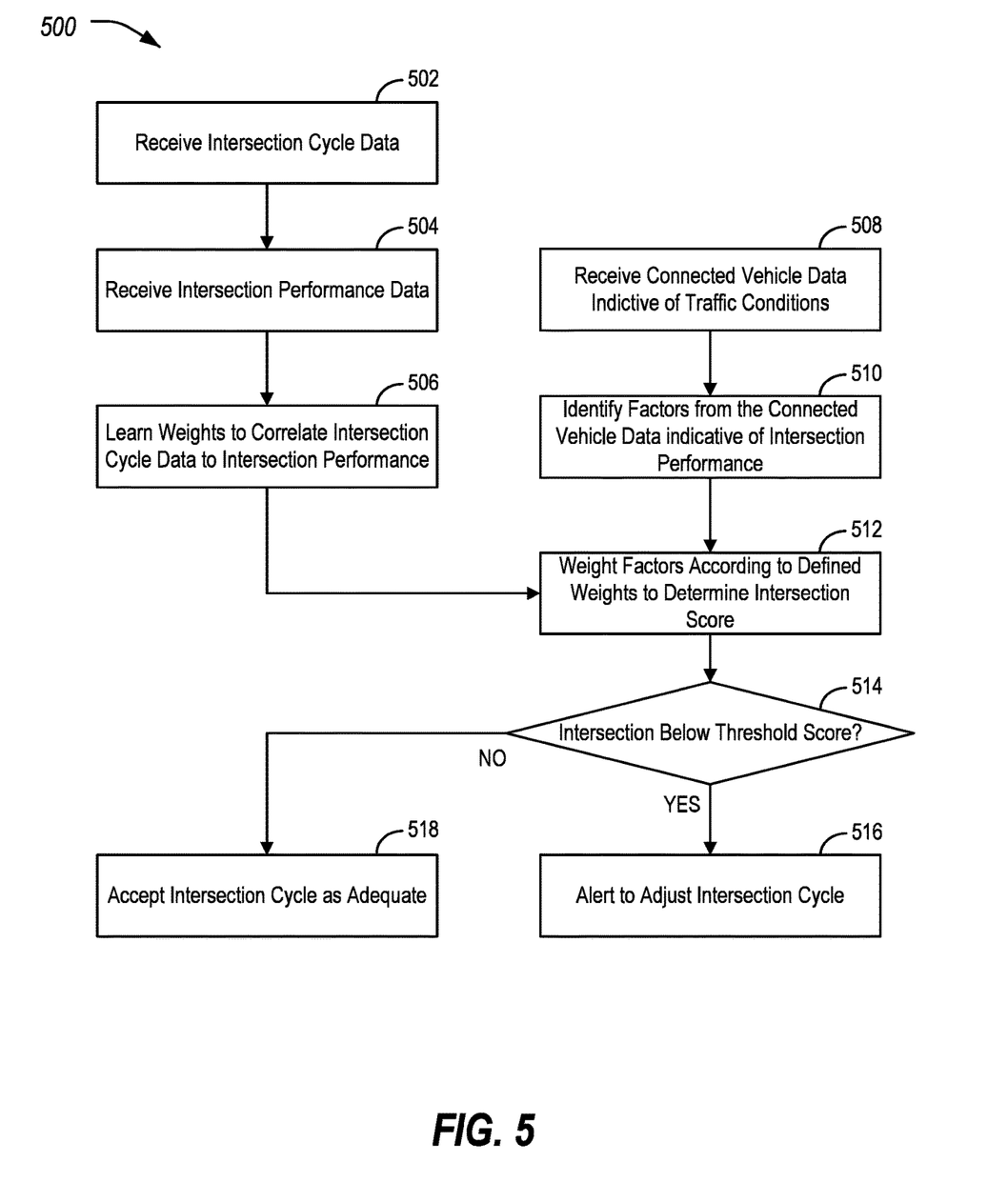
FIG. 5 illustrates an example process for the determination of intersections having issues.

FIG. 5 illustrates an example process 500 for the determination of intersections having issues. In an example, the process 500 may be performed by the cloud server 122 of the system 100 receiving data from various vehicles 102.

At operation 502, the cloud server 122 receives intersection cycle data. In an example, the received data may include connected vehicle data indicative of traffic conditions. This may be useful, as the determinations of intersection issues is based on vehicle-related performance indicators. Additionally, the cloud server 122 may in some examples receive current phase timing information from one or more intersections to be monitored for phase timing.

At operation 504, the cloud server 122 receives intersection performance data. This may include, for example, sensor data regarding backups or lack of backups at intersections. The sensor data may include, for example, data from intersections that have underground wire loops that detect presence of vehicles, images from roadside cameras, or data from other relevant roadway sensors such as V2X traffic data. Additionally or alternatively, this may include information with respect to traffic incidents that have occurred at the intersections.

At operation 506, the cloud server 122 learns weight factors that correlate the intersection cycle data with the ground truth data received at operation 504. In an example, the data received at operation 504 may be correlated by intersection with the data received at operation 502, to form a fuller picture of the various aspects of the intersection. Using this correlated data, a machine learning algorithm may be used to identify, as outputs, the weights x, y, z, and w to be utilized in the score equation given above. Example machine learning aspects to determine the weights from the data may include the use of feed forward neural networks, recurrent neural networks, convolutional neural networks, and/or various regression algorithms and attention functions.

At operation 508, the cloud server 122 receives connected vehicle data indicative of traffic conditions. For instance, the cloud server 122 may receive data from a plurality of vehicles 102 with respect to traffic information for an intersection having a plurality of legs, the intersection being controlled by a traffic control having a cycle for each leg including phases of prohibiting traffic to proceed, allowing traffic to proceed, and warning traffic that the cycle is changing from allowing traffic to proceed to prohibiting traffic to proceed.

At operation 510, the cloud server 122 identifies factors from the connected vehicle data indicative of intersection performance. These factors may include, for example, a number of vehicles that are travelling upstream of the intersection and are required to stop when the traffic light changes phase, a number of vehicles that travel in a perpendicular direction to the intersection when a traffic light of the intersection is red in a vehicle travel direction, number of vehicles that accelerate to travel through the traffic light before the traffic light changes phase, and number of vehicles that brake to stop in advance of the intersection.

At operation 512, the cloud server 122 weights the factors from operation 810 accordance with the weights from operation 506 to determine an intersection score. For instance, the cloud server 122 may generate the score for the intersection according to a weighting of the traffic information, the score indicating a relative level of acceptability of the cycle, according to the equation for scoring discussed above.

At operation 514, the cloud server 122 determines whether the intersection is below a threshold score. For instance, the cloud server 122 may compare the score determined at operation 512 with a minimum intersection score below which adjustment of the cycle may be desired. In another example, the cloud server 122 may determine the lowest scored intersections as determined at operation 512 (e.g., the bottom N scores, the bottom MN of scores, etc.).

At operation 516, an alert may be presented of those indicated intersections. This alert may, for example, suggest the additional placement of sensors or other active technologies to mitigate cycle issues. Or, the alert may indicate that a change in light cycle, e.g., according to the learned weights, may provide for a better result. Accordingly, the cloud server 122 may indicate, based on the score, whether the intersection is a candidate for adjustment of the cycle. At operation 518, the intersection cycle(s) are accepted as adequate. This may be the case if all intersections meet the minimum intersection score, for example.

It should be noted that, while the process 500 is illustrated sequentially, aspects may be performed simultaneously or in orders other than as described. For instance, the learning phase operations 502-506 may be performed independently of the remaining operations 508-518. Additionally, the process 500 may be performed in a loop-wise manner, or upon a condition such as daily or nightly or weekly or if unexpected traffic issues are noted. In sum, connected vehicle data may be used to estimate the effectiveness of unconnected traffic lights based on the other vehicles 102 detected and host vehicle 102 signals in order to determine which intersections are the most taxing and would benefit the most from the limited available resources (such as adding a sensor to regular the phase timing).

Figure 6:
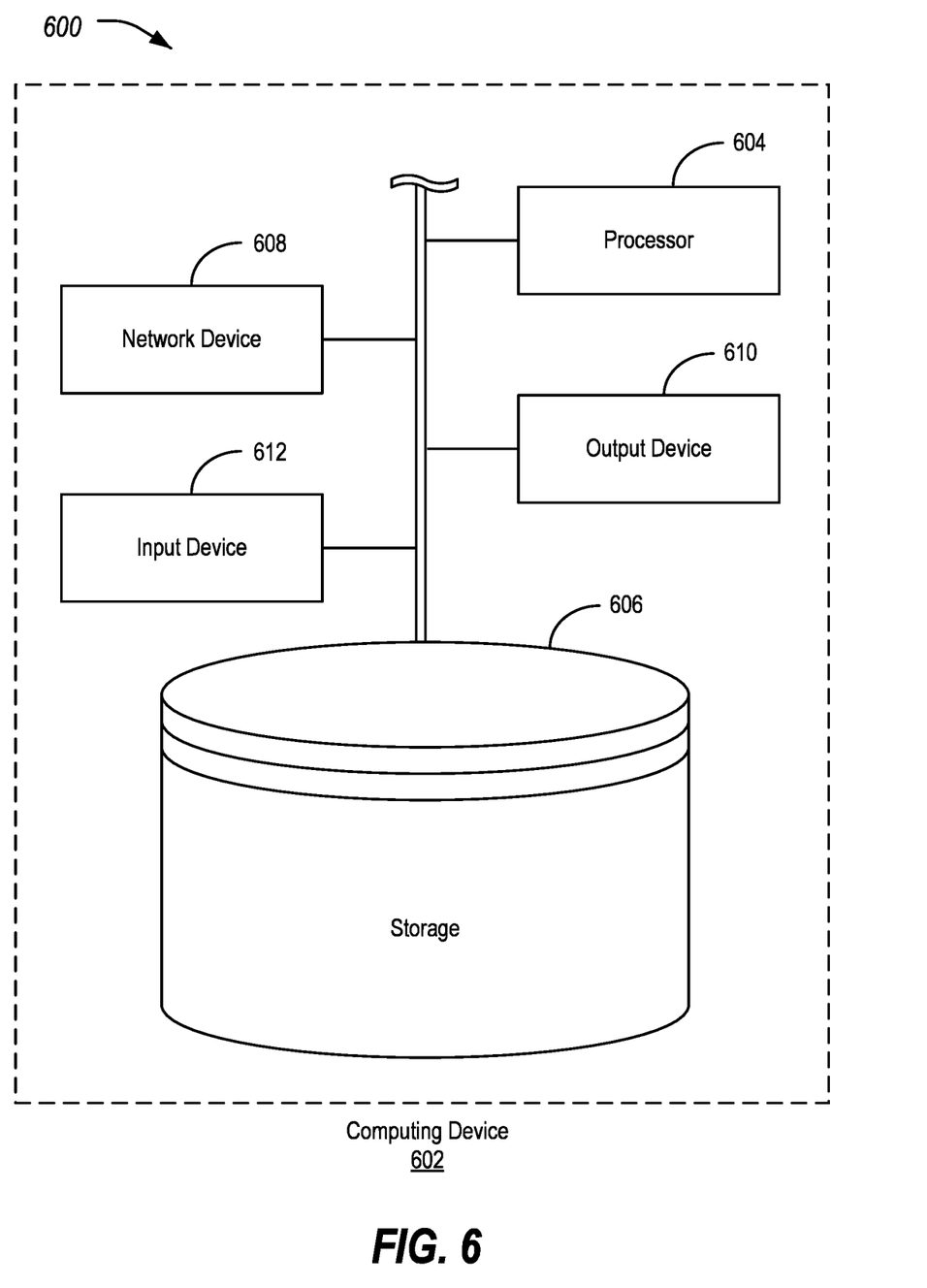
FIG. 6 illustrates an example of a computing device for the use of the vehicles as a sensing platform for traffic light phase timing effectiveness.

FIG. 6 illustrates an example 600 of a computing device 602 for the use of the vehicles 102 as a sensing platform for traffic light phase timing effectiveness. Referring to FIG. 6, and with reference to FIGS. 1-5, the vehicles 102 and the cloud server 124 may be examples of such computing devices 602. As shown, the computing device 602 may include a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or graphics processing unit (GPU). In some examples, the processors 604 are a system on a chip (SoC) that integrates the functionality of the CPU and GPU. The SoC may optionally include other components such as, for example, the storage 606 and the network device 608 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation the processor 604 executes stored program instructions that are retrieved from the storage 606. The stored program instructions, accordingly, include software that controls the operation of the processors 604 to perform the operations described herein. The storage 606 may include both non-volatile memory and volatile memory devices. The non-volatile memory includes solid-state memories, such as NAND flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices that receive human interface inputs may include keyboards, mice, trackballs, touchscreens, voice input devices, graphics tablets, and the like.

The network devices 608 may each include any of various devices that enable the vehicles 102 and cloud server 124 to send and/or receive data from external devices over networks. Examples of suitable network devices 608 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for determining traffic light phase timing effectiveness, comprising:
   a server in communication with a plurality of vehicles, programmed to:
      receive data from a plurality of vehicles with respect to traffic information for an intersection having a plurality of legs, the intersection being controlled by a traffic control having a cycle for each leg including phases of prohibiting traffic to proceed, allowing traffic to proceed, and warning traffic that the cycle is changing from allowing traffic to proceed to prohibiting traffic to proceed, the traffic information including
         a number of vehicles that are travelling upstream of the intersection and are required to stop when the traffic light changes phase,
         a number of vehicles that travel in a cross-traffic direction to the intersection when a traffic light of the intersection is red in a vehicle travel direction,
         a number of vehicles that accelerate to travel through the traffic light before the traffic light changes phase, and
         a number of vehicles that brake to stop in advance of the intersection;
      generate a score for the intersection according to a weighting of the traffic information, the score indicating a relative level of acceptability of the cycle; and
      indicate, based on the score, whether the intersection is a candidate for adjustment of the cycle.

2. The system of claim 1, wherein the traffic information for the intersection includes information from one of the plurality of vehicles about other vehicles that lack connectivity.

3. The system of claim 1, wherein the intersection is a candidate for adjustment responsive to the intersection being ranked below a predefined threshold score, as one of a quantity of low scoring intersections, or as one of a predefined percentage of low scoring intersections.

4. The system of claim 1, wherein the score is determined by:
   weighting the number of vehicles that are travelling upstream of the intersection according to a first constant,
   weighting the number of vehicles that travel in the perpendicular direction to the intersection according to a second constant,
   weighting the number of vehicles that accelerate to travel through the traffic light before the traffic light changes phase according to a third constant, and
   weighting the number of vehicles that perform harsh braking to stop in advance of the intersection according to a fourth constant.

5. The system of claim 4, wherein the server is further programmed to:
   receive intersection cycle data;
   receive intersection performance data; and
   learn the first, second, third, and fourth constants using a machine learning algorithm using the intersection cycle data as inputs and the intersection performance data as ground truth outputs.

6. The system of claim 1, wherein the server is further programmed to indicate in an alert that the intersection is targeted for installation of sensors to actively adjust phase timing.

7. A method for determining traffic light phase timing effectiveness comprising:
   receiving connected vehicle data indicative of traffic conditions for one or more intersections;
   identifying factors from the connected vehicle data that are indicative of intersection performance;
   weighting the factors according to defined weights to determine an intersection score; and
   based on the score failing to meet one or more criteria, providing an alert to adjust intersection cycle.

8. The method of claim 7, further comprising receiving the connected vehicle data from a plurality of vehicles, the connected vehicle data including information from one of the plurality of vehicles about other vehicles that lack connectivity.

9. The method of claim 7, wherein the factors include a plurality of:
   a number of vehicles that are travelling upstream of the intersection and are required to stop when the traffic light changes phase;
   a number of vehicles that travel in a cross-traffic direction to the intersection when a traffic light of the intersection is red in a vehicle travel direction;
   a number of vehicles that accelerate to travel through the traffic light before the traffic light changes phase; and
   a number of vehicles that perform harsh braking to stop in advance of the intersection.

10. The method of claim 7, further comprising:
    receiving intersection cycle data;
    receiving intersection performance data; and
    learning the first, second, third, and fourth constants using a machine learning algorithm using the intersection cycle data as inputs and the intersection performance data as ground truth outputs.

11. The method of claim 7, wherein the intersection has a plurality of legs, and further comprising controlling the intersection via a traffic control having a cycle for each leg including phases of prohibiting traffic to proceed, allowing traffic to proceed, and warning traffic that the cycle is changing from allowing traffic to proceed to prohibiting traffic to proceed.

12. The method of claim 7, further comprising indicating in the alert that the intersection is targeted for installation of sensors to actively adjust phase timing.

13. The method of claim 7, wherein the one or more criteria include the intersection being ranked below a predefined threshold score, the intersection being ranked as one of a quantity of low scoring intersections, and/or the intersection being ranked as one of a predefined percentage of low scoring intersections.

14. A non-transitory computer-readable medium comprising instructions for determining traffic light phase timing effectiveness that, when executed by a processor of a cloud server, cause the cloud server to perform operations including to:
    receive connected vehicle data indicative of traffic conditions for one or more intersections;
    identify factors from the connected vehicle data that are indicative of intersection performance;
    weight the factors according to defined weights to determine an intersection score; and
    based on the score failing to meet one or more criteria, provide an alert to adjust intersection cycle.

15. The medium of claim 14, further comprising instructions that, when executed by the processor of the cloud server, cause the cloud server to perform operations including to receive the connected vehicle data from a plurality of vehicles, the connected vehicle data including information from one of the plurality of vehicles about other vehicles that lack connectivity.

16. The medium of claim 14, wherein the factors include a plurality of:
    a number of vehicles that are travelling upstream of the intersection and are required to stop when the traffic light changes phase;
    a number of vehicles that travel in a cross-traffic direction to the intersection when a traffic light of the intersection is red in a vehicle travel direction;
    a number of vehicles that accelerate to travel through the traffic light before the traffic light changes phase; and
    a number of vehicles that perform harsh braking to stop in advance of the intersection.

17. The medium of claim 14, further comprising instructions that, when executed by the processor of the cloud server, cause the cloud server to perform operations including to:
    receive intersection cycle data;
    receive intersection performance data; and
    learn the first, second, third, and fourth constants using a machine learning algorithm using the intersection cycle data as inputs and the intersection performance data as ground truth outputs.

18. The medium of claim 14, wherein the intersection has a plurality of legs, and further comprising instructions that, when executed by the processor of the cloud server, cause the cloud server to perform operations including to control the intersection via a traffic control having a cycle for each leg including phases of prohibiting traffic to proceed, allowing traffic to proceed, and warning traffic that the cycle is changing from allowing traffic to proceed to prohibiting traffic to proceed.

19. The medium of claim 14, comprising instructions that, when executed by the processor of the cloud server, cause the cloud server to perform operations including to indicate in the alert that the intersection is targeted for installation of sensors to actively adjust phase timing.

20. The medium of claim 14, wherein the one or more criteria include the intersection being ranked below a predefined threshold score, the intersection being ranked as one of a quantity of low scoring intersections, and/or the intersection being ranked as one of a predefined percentage of low scoring intersections.

\* \* \* \* \*